(No Model.)
E. SCHUCHARDT.
Jacking Wheel for Vehicles.
No. 235,302. Patented Dec. 7, 1880.
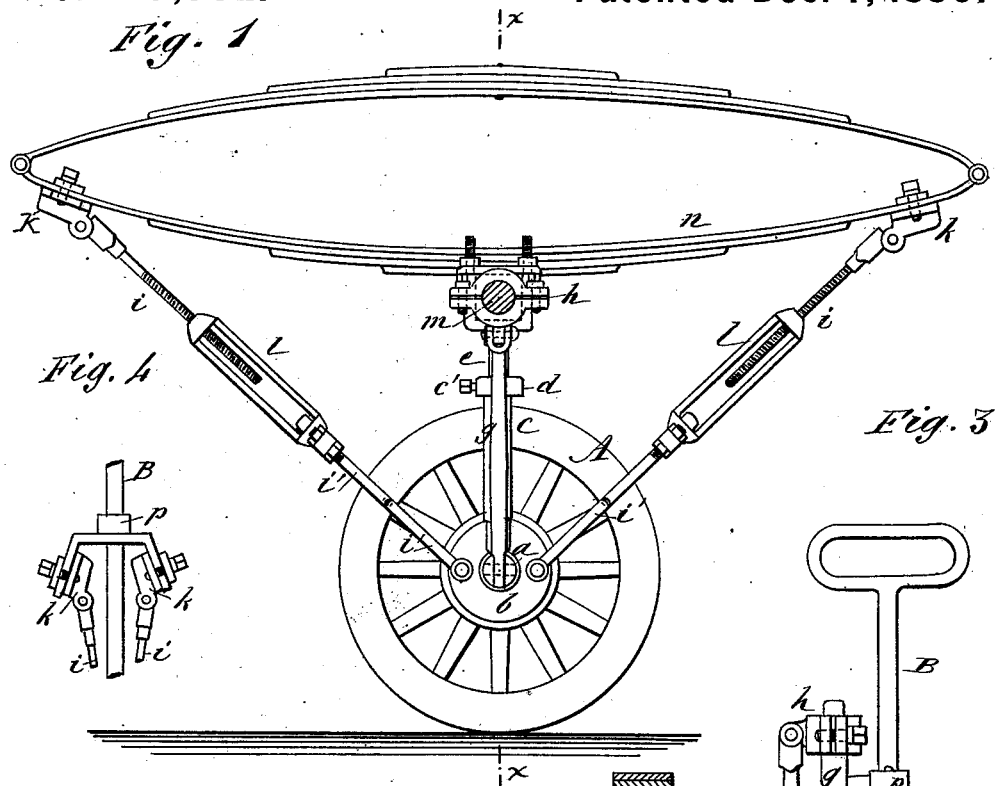
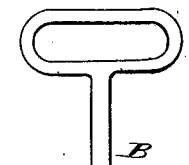
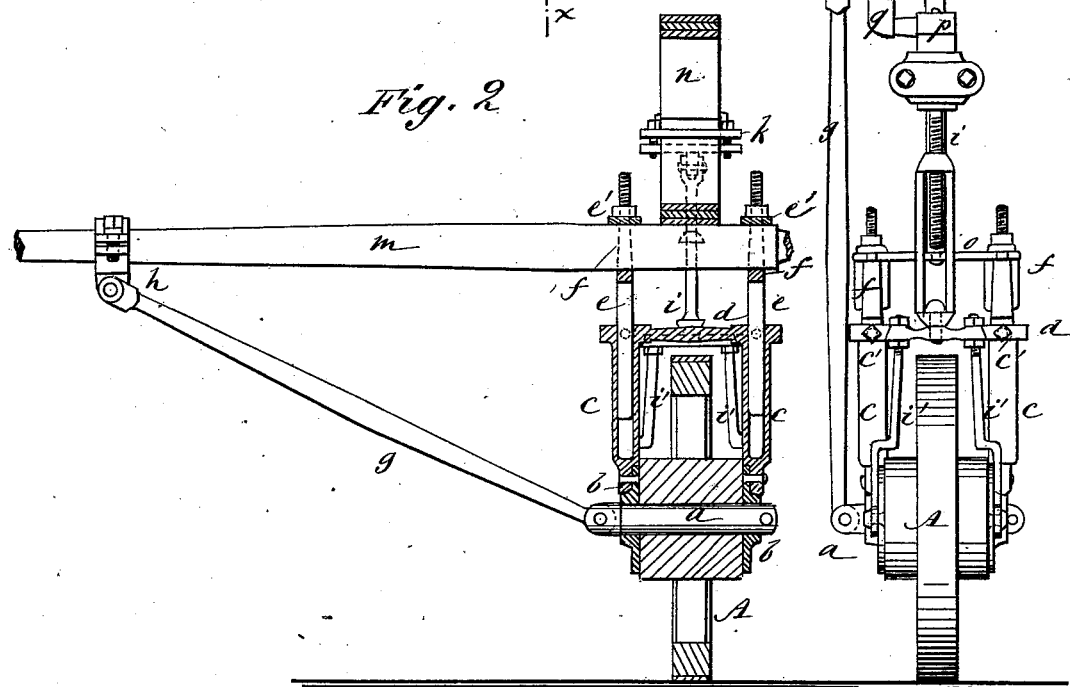
WITNESSES:
INVENTOR:
E. Schuchardt
BY Munn & Co
ATTORNEYS.

UNITED STATES PATENT OFFICE.

EMIL SCHUCHARDT, OF NEW YORK, N. Y.

JACKING-WHEEL FOR VEHICLES.

SPECIFICATION forming part of Letters Patent No. 235,302, dated December 7, 1880.

Application filed October 9, 1880. (No model.)

*To all whom it may concern:*

Be it known that I, EMIL SCHUCHARDT, of the city, county, and State of New York, have invented a new and Improved Jacking-Wheel for Vehicles, of which the following is a specification.

My improvements relate to devices for use in removing disabled wagons, trucks, and other vehicles.

It is usual in case a wheel or axle breaks to rig a temporary support for the vehicle, so that it may be removed for repairs, and this involves considerable labor and time, especially if the vehicle be loaded, as the load must first be removed.

The object of my invention is to furnish an apparatus which can be readily attached to a broken axle or in place of a broken wheel to permit removal of the vehicle without delay.

The invention consists in a wheel fitted in adjustable standards and provided with clamps and braces for its attachment to a vehicle, the same forming a jacking-wheel ready for use at any time and of a portable character.

In the accompanying drawings, forming part of this specification, Figure 1 is a side elevation of the apparatus as applied to a broken axle. Fig. 2 is a vertical transverse section on line $x$ $x$ of Fig. 1, and Fig. 3 is an end elevation of the apparatus as arranged for moving from place to place. Fig. 4 is a detail view.

Similar letters of reference indicate corresponding parts.

A is the wheel, preferably of small size, and made very strong and substantial to meet all requirements. $a$ is a spindle passing through the hub of wheel A, and fitted with cap-plates $b$ at the ends, between which the wheel can turn freely on the spindle. The caps $b$ are formed with or have attached to them tubes $c$ $c$, that are connected rigidly at their outer ends by a cross-bar, $d$. In the tubes $c$ rods $e$ are fitted to slide, and the tubes are provided with set-screws $c'$ for clamping rods $e$ in place. On the outer ends of rods $e$ clamping-boxes $f$ are fitted, such boxes being formed by forking the ends of rods $e$ and fitting the forks with plates $e'$ and nuts for clamping the plates, whereby a rectangular box is formed adapted for receiving the axle of a vehicle. These devices constitute adjustable standards carrying the wheel.

The inner end of spindle $a$ is slotted to receive the end of a brace-rod, $g$, that is attached by a cross-pin. The outer end of rod $g$ is provided with a clamping-box, $h$, that is composed of an upper and lower plate connected by bolts, whereby the axle of the vehicle can be clamped between the plates.

The box $h$ is made with a circular aperture to fit iron axles of usual form, and the box is preferably connected to rod $g$ by a pivot-joint to accommodate variations in the axle caused by adjustment of the standard.

To the cap-plates $b$ rods $i$ are attached by yokes $i'$, so that the rods may swing in a plane at right angles to spindle $a$. These rods $i$ are at opposite sides of the spindle, and are fitted at their outer ends with hinged clamping-boxes $k$, which are formed for being clamped upon the spring of a vehicle. The rods $i$ are also fitted with turn-buckles $l$, whereby they may be adjusted in length and drawn tight to hold the wheel-standard rigidly.

The manner of attachment to a vehicle is clearly shown in the drawings, wherein $m$ represents the axle, and $n$ the spring.

The standard being first adjusted in length by adjustment of rods $e$, so as to bring the axle level, the boxes $f$ are then to be clamped on the axle. The box $h$ of rod $g$ is then to be clamped to the axle, boxes $k$ clamped to the spring, and rods $i$ tightened by the turn-buckles. The wheel and standard are thus rigidly held and braced against strain in every direction. The wheel takes the place of the disabled wheel, so that the vehicle can be moved.

This jacking-wheel can be readily carried on a wagon or truck, as it occupies but little space. To permit of its being readily moved from place to place, I provide a handle, B, (shown in Fig. 3.) This is fitted with a plate, $o$, at the outer end for being clamped in the boxes $h$, and carries a slide, $p$, that is formed with flanges (see Fig. 4) for entering boxes $k$. The slide $p$ is also formed with a pin, $q$, for entering box $h$. The handle is thus attached firmly and the apparatus closed in compact form, so as to be held by the handle and rolled along.

Having thus described my invention, I claim as new and desire to secure by Letters Patent—

1. The jacking-wheel for vehicles, consisting of wheel A, adjustable standards c c, provided with boxes f, brace-rod g, having box h, and brace-rods i, having boxes k, combined for use substantially as shown and described.

2. In jacking-wheels for vehicles, the brace-rods g i, provided with adjustable clamping-boxes h k, combined with the wheel and adjustable standard, substantially as and for the purposes set forth.

3. In jacking-wheels for vehicles, the tubes c, caps b, rods e, and set-screws c′, combined with wheel A and spindle a, substantially as and for the purposes set forth.

4. The handle B, provided with plate o, and flanged slide p, having pin q, in combination with the jacking-wheel having boxes f, swinging rods g i, and boxes h k, substantially as and for the purposes set forth.

EMIL SCHUCHARDT.

Witnesses:
GEO. D. WALKER,
C. SEDGWICK.